US009037154B2

(12) United States Patent
van Diggelen et al.

(10) Patent No.: US 9,037,154 B2
(45) Date of Patent: *May 19, 2015

(54) METHOD AND APPARATUS FOR PROCESSING POSITION INFORMATION IN A MOBILE DEVICE

(75) Inventors: Frank van Diggelen, San Jose, CA (US); Charles Abraham, Los Gatos, CA (US)

(73) Assignee: GLOBAL LOCATE, INC., San Jose, CA (US)

( * ) Notice: Subject to any disclaimer, the term of this patent is extended or adjusted under 35 U.S.C. 154(b) by 1350 days.

This patent is subject to a terminal disclaimer.

(21) Appl. No.: 11/773,062

(22) Filed: Jul. 3, 2007

(65) Prior Publication Data

US 2008/0039117 A1    Feb. 14, 2008

Related U.S. Application Data

(63) Continuation of application No. 10/823,504, filed on Apr. 13, 2004, now Pat. No. 7,254,404.

(51) Int. Cl.
*H04W 24/00* (2009.01)
*G01S 19/39* (2010.01)
*G01S 19/42* (2010.01)
*G01S 19/25* (2010.01)

(52) U.S. Cl.
CPC .............. *G01S 19/39* (2013.01); *G01S 19/25* (2013.01); *G01S 19/42* (2013.01)

(58) Field of Classification Search
USPC .......... 455/456.1, 456.2, 456.3, 456.6, 456.4, 455/456.5; 342/357.09, 357.12
See application file for complete search history.

(56) References Cited

U.S. PATENT DOCUMENTS

| 6,075,458 | A  | * | 6/2000  | Ladner et al. ............ 340/825.49 |
| 6,433,735 | B1 | * | 8/2002  | Bloebaum et al. .......... 342/357.1 |
| 2003/0045304 | A1 | * | 3/2003  | Shamoto et al. ............. 455/456 |
| 2003/0050077 | A1 | * | 3/2003  | Takeuchi et al. ............. 455/456 |
| 2004/0157622 | A1 | * | 8/2004  | Needham ................... 455/456.1 |
| 2004/0203569 | A1 | * | 10/2004 | Jijina et al. ................. 455/404.1 |
| 2005/0200492 | A1 | * | 9/2005  | Woodard et al. ............. 340/632 |

* cited by examiner

*Primary Examiner* — Justin Lee
(74) *Attorney, Agent, or Firm* — Sterne Kessler Goldstein & Fox P.L.L.C.

(57) ABSTRACT

Method and apparatus for processing position information in a mobile device is described. In one example, a request for a position to be computed within a predefined period of time is received. A plurality of positions is calculated within the predefined period of time. At least one of the plurality of positions is cached in a position cache. Accuracy data is derived with respect to at least one of the plurality of positions. A best position stored in the position cache is identified in response to the accuracy data. The best position may be sent to a server in communication with the mobile device.

28 Claims, 5 Drawing Sheets

METHOD AND APPARATUS FOR PROCESSING POSITION INFORMATION IN A MOBILE DEVICE

CROSS-REFERENCE TO RELATED APPLICATIONS

This application is a continuation of U.S. patent application Ser. No. 10/823,504 filed on Apr. 13, 2004, which is incorporated herein by reference.

BACKGROUND OF THE INVENTION

1. Field of Invention

The present invention generally relates to satellite position location systems and, more particularly, to a method and apparatus for processing position information in a mobile device.

2. Description of the Background Art

In an effort to enhance GPS signal processing, a GPS receiver (also referred to as a mobile station or MS) can be assisted with certain a-priori information. Such assisted GPS (A-GPS) receivers generally are provided with an estimate of the receiver's position and information regarding the satellite constellation (e.g., ephemeris, satellite orbit information and/ or a satellite almanac). The information is provided to the A-GPS receiver via a wireless network such as, for example, a cellular telephone network. In an MS-based mode, an A-GPS receiver uses the assistance information and the received GPS signals to compute its position. This position is then sent to a position server for use by the network (e.g., to be forwarded to an emergency response provider such that the provider receives the location of the cell phone user).

Generally, the position server requests that the position be computed by the MS in a predefined period. The MS processes the GPS signals in an iterative process such that, from an initial, inaccurate position estimate, an accurate position is determined as GPS signals are repeatedly received and processed. In a low signal level environment (e.g., indoors), the MS may require an extensive period of time to compute an accurate position. At times, the computation period required to determine an accurate position may be longer than the predefined period. When that happens, the MS stops computing at the end of the predefined period and sends the server the last computed position, whether accurate or not. Such an inaccurate position can be problematic when the position is being used to locate a user to provide emergency services.

In other versions of an A-GPS receiver, the receiver may have an internal timer that establishes a time period within which the position is calculated. The receiver produces the last position computation result as the "correct" position. However, the last result may not be the most accurate result. As such, an inaccurate result may be sent to the server or displayed to the user.

Therefore, there is a need in the art for an improved method, apparatus, and system for determining a position of an A-GPS receiver.

SUMMARY OF THE INVENTION

Method and apparatus for processing position information in a mobile device is described. In one embodiment, a request for a position to be computed within a predefined period of time is received. A plurality of positions is calculated within the predefined period of time. At least one of the plurality of positions is cached in a position cache. Accuracy data is derived with respect to at least one of the plurality of positions. A best position stored in the position cache is identified in response to the accuracy data. The best position may be sent to a server in communication with the mobile device.

In another embodiment, a request for a position to be computed within a predefined period of time is received. A best position and a corresponding indicia of accuracy are computed within the predefined period of time. The indicia of accuracy is compared to a threshold. The best position is retained in a cache in response to the indicia of accuracy satisfying the threshold. The best position may be sent to a server in communication with the mobile device. In one embodiment, a previously retained position in the cache having a best accuracy is identified in response to the indicia of accuracy failing the threshold. The previously retained position may then be sent to the server, instead of the best position.

BRIEF DESCRIPTION OF DRAWINGS

The teachings of the present invention may be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A method, apparatus and system for locating a position of a mobile device is described. Those skilled in the art will appreciate that the invention may be used with various types of mobile or wireless devices that are "location-enabled", such as cellular telephones, pagers, laptop computers, personal digital assistants (PDAs), and like type wireless devices known in the art. Generally, a location-enabled mobile device is facilitated by including in the device the capability of processing global positioning system (GPS) satellite signals. Although GPS is described as an embodiment of a system for providing positioning signals, other satellite-based systems may be used, such as GLONASS, GALILEO, and the like.

Figure 1:
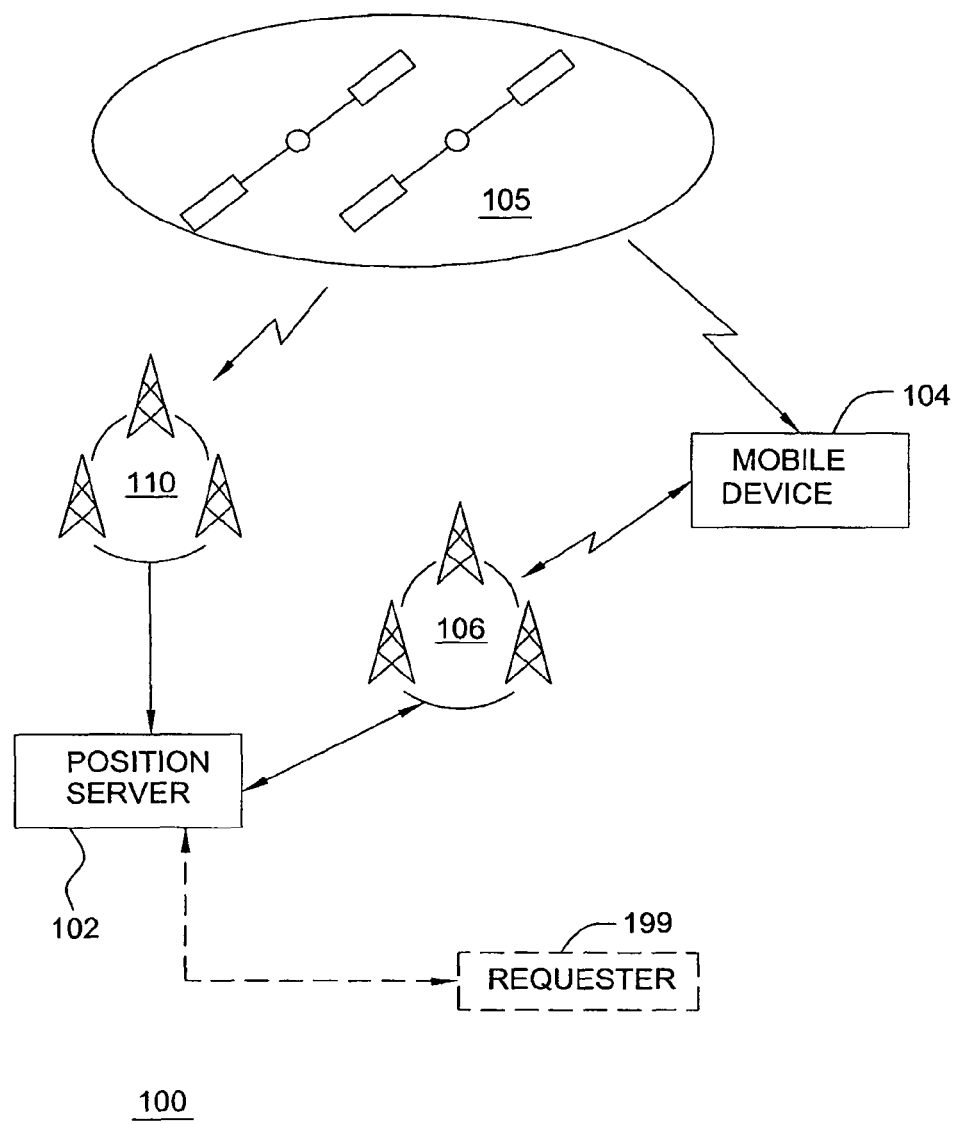
FIG. 1 is a block diagram depicting an exemplary embodiment of a position location system.

FIG. 1 is a block diagram depicting an exemplary embodiment of a position location system 100 (referred to herein as an assisted-GPS (A-GPS system)). The system 100 comprises a position server 102, a reference network 110, a wireless communications system 106, and a location-enabled mobile device 104. For purposes of clarity, the system 100 is shown with only a single mobile device 104. It is to be understood, however, that the position server 102 may be in communication with one or more mobile devices. The mobile device 104 is in communication with the server 102 via the wireless communication system 106 (e.g., cellular telephone network).

In one embodiment of the invention, the server 102 transmits a request for a position of the mobile device 104 (however, in other embodiments, the request can be initiated by a third party requester 199 or the mobile device 104 itself may request its own position). The request includes a parameter indicating that the mobile device 104 must calculate the position within a predefined period of time. The mobile device 104 computes the position using aiding data (as described below). The position computation is stopped before the predefined period expires. The mobile device 104 compares the calculated position to a predetermined accuracy threshold (described in further detail below). A calculated position below the predetermined accuracy threshold indicates that the calculated position is accurate to within an acceptable margin of error. The mobile device 104 subsequently transmits the calculated position to the position server 102. However, a calculated position above the predetermined accuracy threshold indicates that the calculated position contains an unacceptable level of error. When the calculated position is unacceptable, the mobile device 104 accesses a position cache that contains previously computed, accurate positions. The most accurate computed position is retrieved from the cache and transmitted to the position server 102 in lieu of transmitting the presently computed inaccurate position.

In one embodiment of the invention, the mobile device 104 uses aiding data from the server 102 to assist in acquisition of the satellite signals. The use of aiding data to assist in GPS signal acquisition is described in commonly-assigned U.S. Pat. No. 6,453,237, issued Sep. 17, 2002, and incorporated herein by reference in its entirety.

Generally, the position server 102 is supplied information regarding the satellite network from a reference network 110 to generate the aiding data that is delivered to the mobile device 104. The server 102 receives the satellite information from an external source, such as a network of satellite signal receivers ("reference network 110"). The reference network 110 may include several tracking stations that collect satellite information from all the satellites 105 in the constellation, or a few tracking stations, or a single tracking station that only collects satellite tracking information for a particular region of the world. One such reference network is described in commonly-assigned U.S. Pat. No. 6,411,892, issued Jun. 25, 2002, and incorporated herein by reference in its entirety. The satellite tracking information includes, for example, at least one of the satellite navigation messages (e.g., ephemeris), code phase measurements, long term orbit information carrier phase measurements, and Doppler estimates. In one embodiment of the invention, the server 102 receives the ephemeris portion of the satellite navigation data for at least the plurality of satellites 105 that are in view of the mobile device 104. The server 102 transmits the aiding data via the wireless communication system 106 to the mobile device 104.

The mobile device 104 uses the aiding data to assist in receiving the signals from the satellites 105. Basically, the aiding data provides a priori knowledge of signal timing and phase such that the mobile device 104 can rapidly acquire the satellite signals or acquire the signals in a low signal strength environment.

Figure 2:
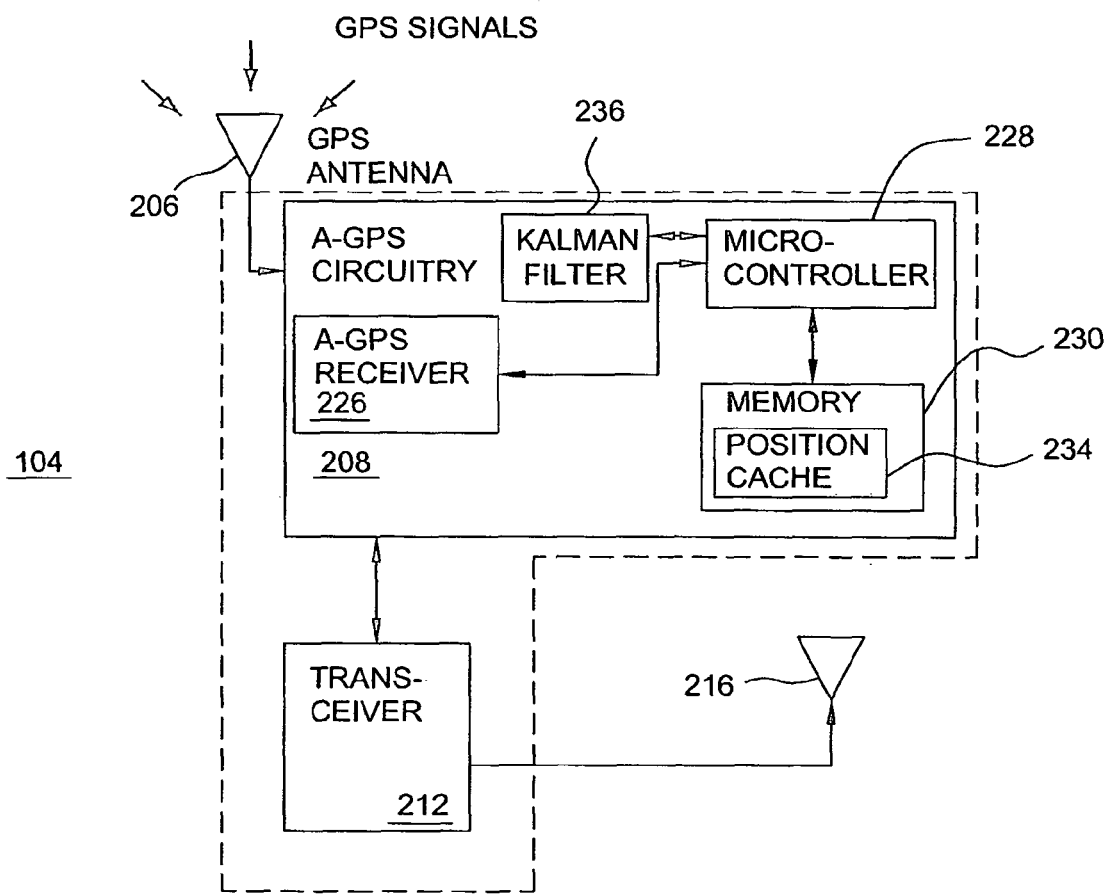
FIG. 2 is a block diagram depicting an exemplary embodiment of a mobile device in accordance with the invention.

FIG. 2 depicts a block diagram of the mobile device 104 in accordance with one embodiment of the present invention. Aspects of FIG. 2 may be understood with simultaneous reference to FIG. 1. A-GPS circuitry 208 is contained in the mobile device 104 along with a wireless communication transceiver 212 and an antenna 216. The A-GPS circuitry 208 comprises an A-GPS receiver 226, a microcontroller 228, a Kalman filter 236, and a memory 230. One embodiment of the A-GPS circuitry 208 used to receive and process GPS signals and aiding data is described in commonly-assigned U.S. Pat. No. 6,606,346, issued Aug. 12, 2003, and incorporated herein by reference in its entirety. The A-GPS receiver 226 processes GPS satellite signals that are received by the antenna 206 to determine the geographic position of the mobile device 104. Generally, the aiding data is received by the wireless transceiver 212 via antenna 216 from the wireless network 106. The aiding data is coupled to the A-GPS circuitry 208 and may be stored in memory 230. The aiding data is used in a conventional manner to enable the A-GPS receiver 226 to decode GPS satellite signals having extremely low signal-to-noise ratios. The microcontroller 228, in one embodiment of the invention, processes the decoded satellite signal data to determine a geographic position of the mobile device 104. As the positions are computed, they are stored in a position cache 234. In one embodiment, the position cache 234 is a buffer memory that retains a predefined number of positions or the position cache may be a register that contains the best position of the most recently computed positions.

Upon request from the position server 102, the computed positions may be sent from the mobile device 104 to the position server 102. Generally, the position server 102 sends a position request to the mobile device 104 whenever a position is needed (e.g., requested by a 911 call center). The mobile device 104 will compute a position in response to the request. As such, between requests the mobile device 104 may not compute positions to save power. Alternatively, in lieu of an external request, the mobile device 104 may use an internal timer to request positions to be computed on a regular basis.

In addition to the position, the microcontroller 228 derives a measure of accuracy for each computed position, known as the indicia of accuracy. This accuracy data may be derived from a covariance matrix of the Kalman filter 236, by analyzing the residuals of the pseudo-range computation, or by monitoring the horizontal dilution of precision (HDOP). Regardless of the method used to measure the accuracy of a computed position, the accuracy data is stored in the memory 230 with the associated position. Furthermore, it is important to note that the accuracy data comprises of one or more indicia of accuracy.

By way of example, the receiver may monitor the covariance matrix of the Kalman filter 236 that resides in the mobile device 104. The Kalman filter 236 generally filters a number of parameters of the mobile device 104 such that the parameters are weighted by the history of the parameters. The covariance matrix reflects the expected magnitude of the pseudo-range calculation residuals after the next computation. Other measures of accuracy can be used in lieu of the Kalman filter 236 covariance matrix, including a post computation measure of the residuals. Using one or more measures of accuracy, the receiver can determine the accuracy of each position computation.

Figure 3:
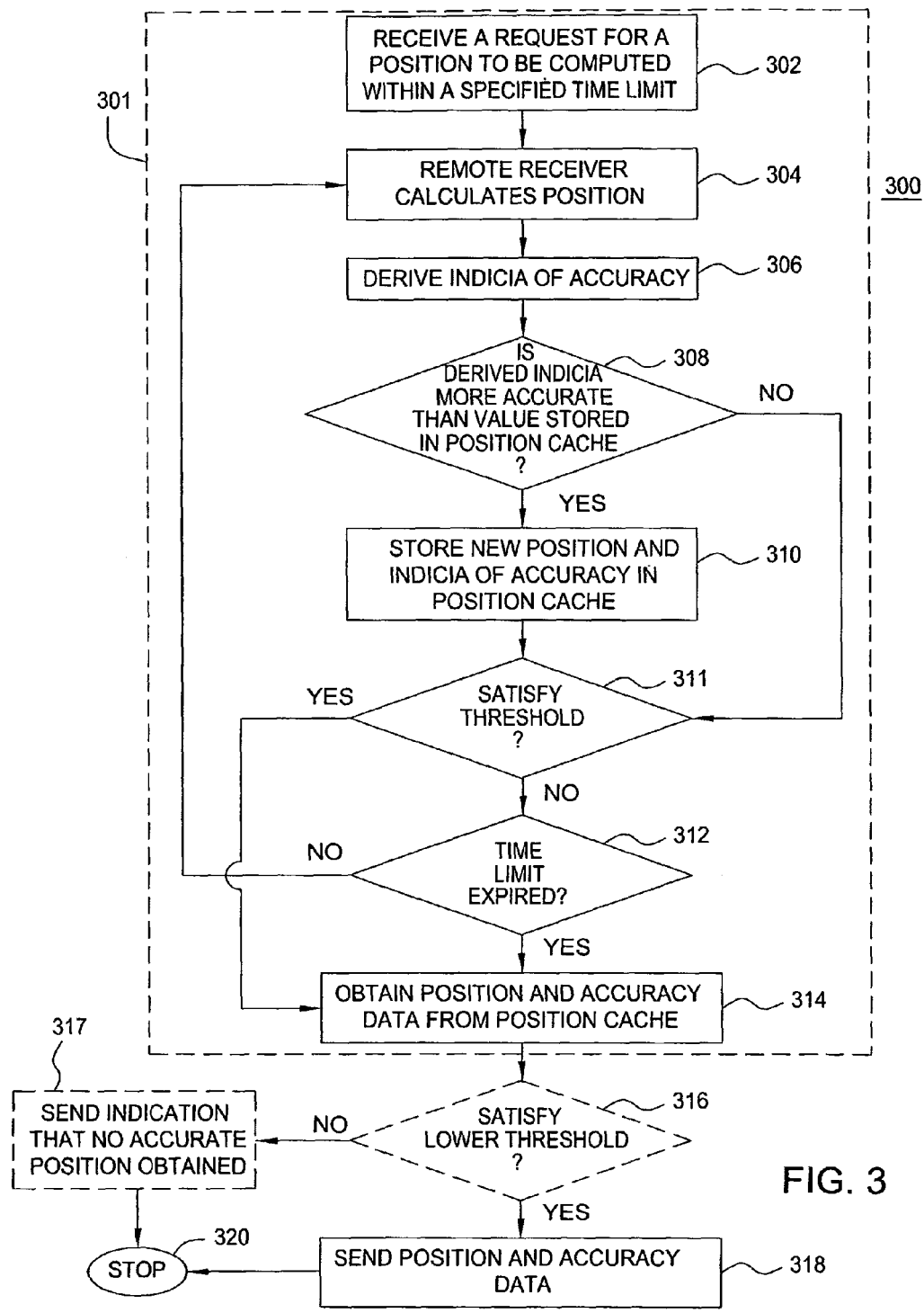
FIG. 3 is a flow diagram depicting an exemplary embodiment of a method for processing position information in a mobile device in accordance with the invention.

FIG. 3 is a flow diagram depicting an exemplary embodiment of a method 300 for processing position information in a mobile device in accordance with the invention. Aspects of the method 300 may be understood with reference to FIGS. 1 and 2. The method 300 commences at step 302, where a request for position is received. The request may be externally generated (e.g., generated by the position server 102). Alternatively, the request may be generated internally within the mobile device 104 (e.g., a user of the mobile device 104 may trigger the request). In either case, the position request also includes instructions directing the mobile device 104 to calculate the position within a predefined time period (e.g., one minute). At step 304, a position of the mobile device 104 is calculated in a manner that is typical for an A-GPS receiver. At step 306, an indicia of accuracy is derived for the position calculated at step 304. For example, the covariance matrix of the Kalman filter 236 in the mobile device 104 may be processed to determine the indicia of accuracy for the calculated position.

At step 308, a determination is made as to whether the calculate position is more accurate than a position stored in the position cache 234. If the accuracy of the calculated position is not better than that of the stored position, then the method 300 proceeds to step 312. At step 312, a determination is made as to whether the specified time period has expired. If so, the method 300 proceeds to step 314. Otherwise, the method returns to step 304. If, at step 308, the accuracy of the calculated position is better than that of the stored position, then the method 300 proceeds to step 310.

At step 310, the calculated position and associated indicia of accuracy replace the stored position and associated indicia of accuracy in the position cache 234. For example, the position cache 234 may comprise a register configured to store a single position result and a single accuracy result. Alternatively, the position cache 234 may comprise a memory capable of storing multiple position results and accuracy results (e.g., a buffer). If such a memory is employed, the calculated position and associated indicia of accuracy need not replace the stored position and associated indicia of accuracy at step 310. Instead, the calculated position may be flagged as being the most accurate position stored in the position cache 234. The flagged position is then used in the comparison performed at step 308.

From step 310, the method 300 proceeds to step 311, where a determination is made as to whether the calculated position satisfies an accuracy threshold. If the accuracy is regarded as satisfactory, the method 300 proceeds to step 314. Otherwise, the method proceeds to step 312. In this manner, if a sufficiently accurate position is calculated before the expiration of the specified time limit, the method 300 may immediately proceed to step 314 without calculating further positions. At step 314, a position and corresponding indicia of accuracy is obtained from the position cache 234. If the position cache 234 stores more than one position result, then the most accurate position is obtained at step 314. The steps 302 through 314 comprise an exemplary embodiment of a method 301 for computing a best position within a specified time period.

In one embodiment, the method 300 proceeds from step 314 to step 318, where the position and corresponding indicia of accuracy is sent to the position server 102. Alternatively, only the position may be sent to the position server 102. The method 300 ends at step 320. In another embodiment, from step 314, the method 300 proceeds to optional step 316. At step 316, a determination is made as to whether the position obtained from the position cache 234 at step 314 is sufficiently accurate. The threshold employed at step 316 may be lower than that employed at step 311. If the position obtained from the position cache 234 is sufficiently accurate, the method 300 proceeds to step 318. Otherwise, the method 300 proceeds to optional step 317, where the mobile device 104 sends an indication to the position server 102 that no accurate position has been obtained. The method 300 then ends at step 320.

It will be appreciated that if a calculated position has satisfied the accuracy threshold imposed at step 311, then the comparison at optional step 316 need not be performed, since the calculated position has already been deemed to be sufficiently accurate. The step 316 may be performed to avoid sending poor position results to the position server 102. Notably, the best position produced by the method 301 may be very inaccurate and thus it is warranted to discard such position and inform the position server 102 that an accurate position was not obtained.

Figure 4:
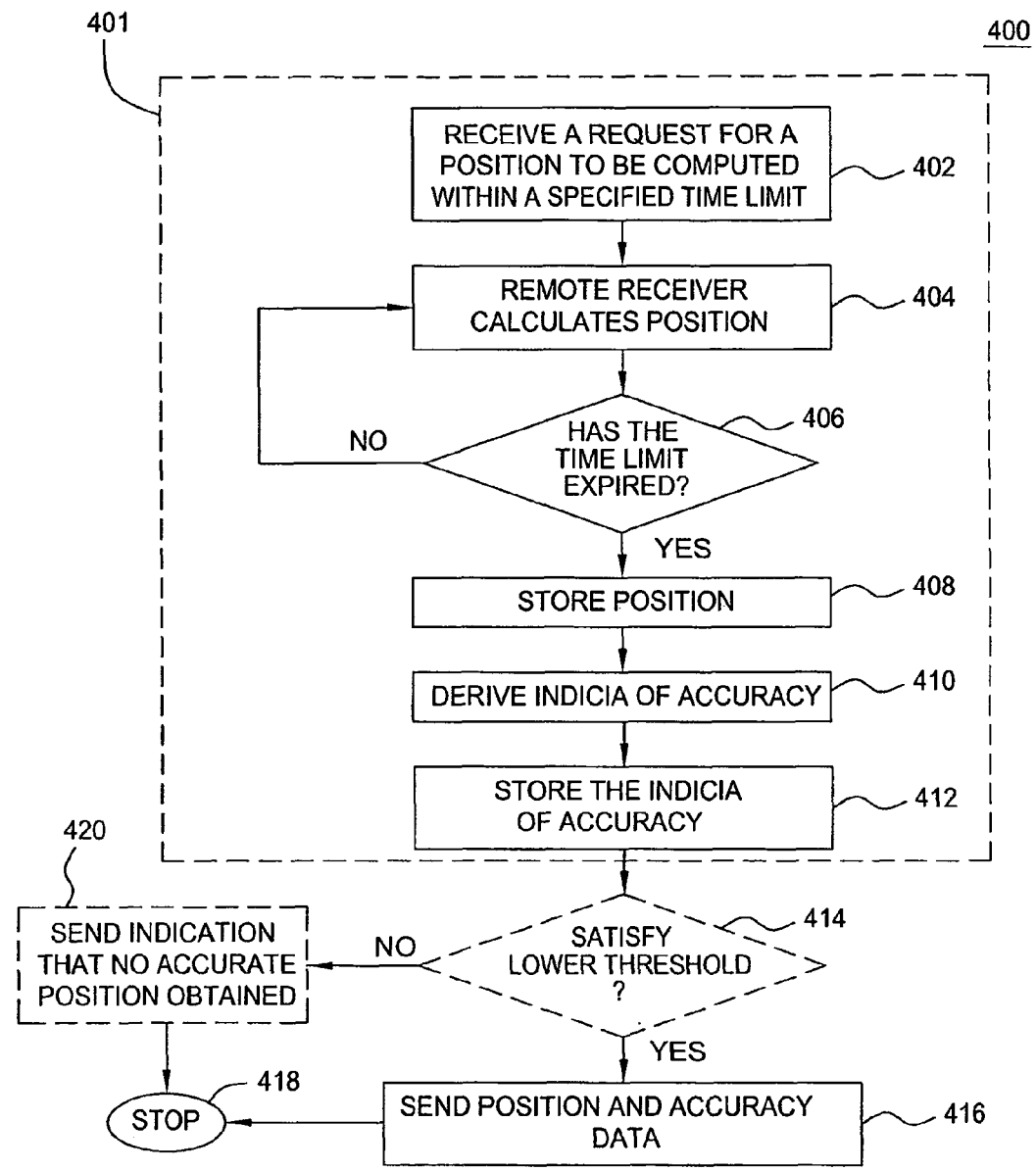
FIG. 4 is a flow diagram depicting another embodiment of a method for processing position information in a mobile device in accordance with the invention.

FIG. 4 is a flow diagram depicting another exemplary embodiment of a method 400 for processing position information in a mobile device in accordance with the invention. Aspects of the method 400 may be understood with reference to FIGS. 1 and 2. The method 400 commences at step 402, where a request for position is received. The request may be externally generated (e.g., generated by the position server 102). Alternatively, the request may be generated internally within the mobile device 104 (e.g., a user of the mobile device 104 may trigger the request). In either case, the position request also includes instructions directing the mobile device 104 to calculate the position within a predefined time period. At step 404, a position of the mobile device 104 is calculated in a manner that is typical for an A-GPS receiver.

At step 406, a determination is made as to whether the specified time period has expired. If not, the method 400 returns to step 404. Otherwise, the method proceeds to step 408, where the last calculated position is stored in the position cache 234. That is, the method 400 repeatedly calculates position of the mobile receiver 104 until the specified time limit has expired, at which time the last position calculated is stored in the position cache 234. At step 410, an indicia of accuracy is derived for the position stored at step 408. For example, the covariance matrix of the Kalman filter 236 in the mobile device 104 may be processed to determine the indicia of accuracy for the stored position. At step 412, the derived indicia of accuracy is stored in the position cache 234. The steps 402 through 412 comprise another exemplary embodiment of a method 401 for computing a best position within a specified time period.

In one embodiment, the method 400 proceeds from step 412 to step 416, where the position and corresponding indicia of accuracy is sent to the position server 102. Alternatively, only the position may be sent to the position server 102. The method 400 then ends at step 418. In another embodiment, from step 412, the method 400 proceeds to optional step 414. At step 414, a determination is made as to whether the position stored in the position cache 234 is sufficiently accurate (i.e., does the stored position satisfy an accuracy threshold). If the stored position is sufficiently accurate, the method 400 proceeds to step 416. Otherwise, the method 400 proceeds to optional step 420, where the mobile device 104 sends an indication to the position server 102 that no accurate position has been obtained. The method 400 then ends at step 418.

Figure 5:
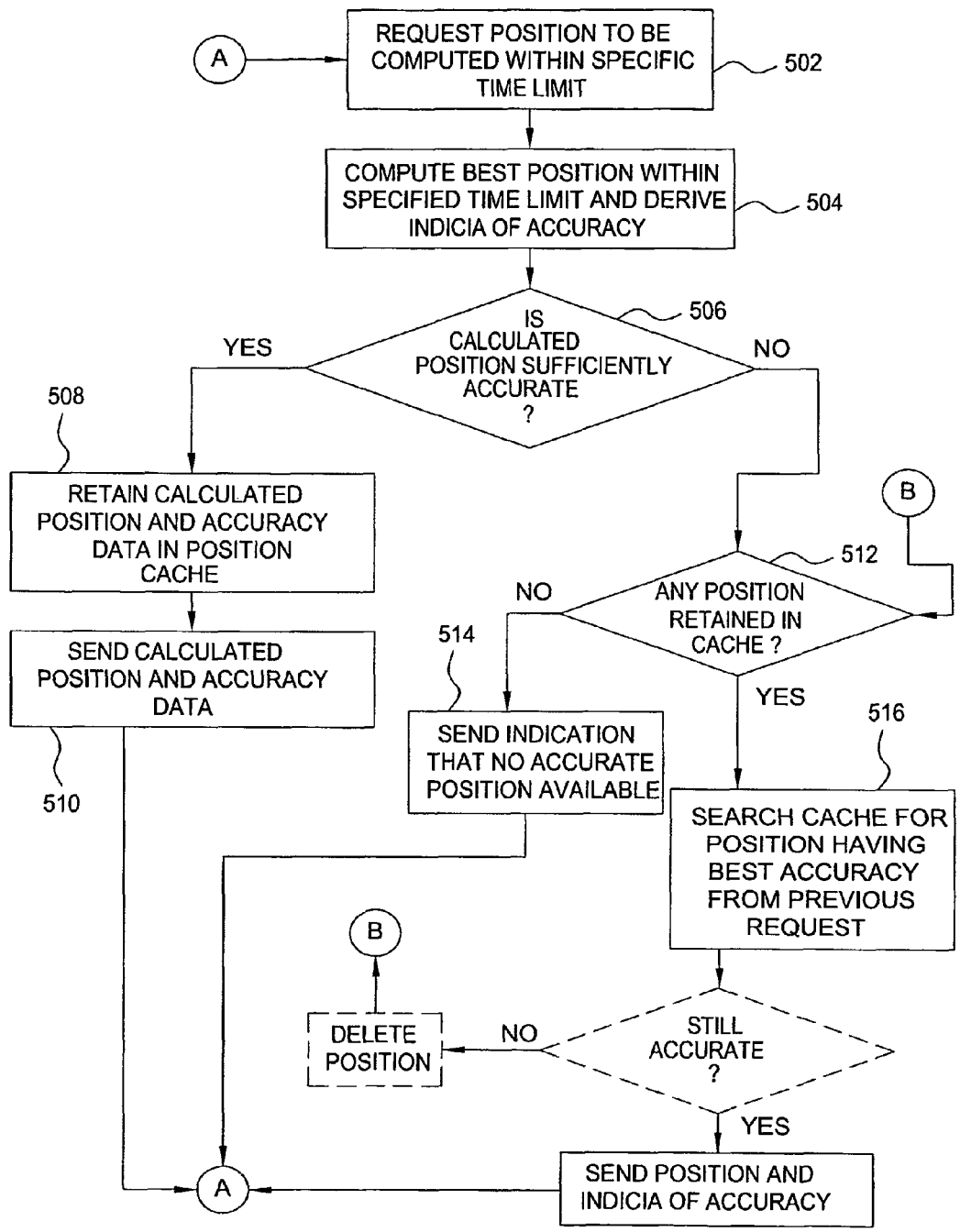
FIG. 5 is a flow diagram depicting yet another embodiment of a method for processing position information in a mobile device in accordance with the invention.

FIG. 5 is a flow diagram depicting yet another exemplary embodiment of a method 500 for processing position information in a mobile device in accordance with the invention. Aspects of the method 500 may be understood with reference to FIGS. 1 and 2. The method 500 begins at step 502, where a position of the mobile receiver 104 is requested. The request may be externally generated (e.g., generated by the position server 102). Alternatively, the request may be generated internally within the mobile device 104 (e.g., a user of the mobile device 104 may trigger the request). In either case, the position request also includes instructions directing the mobile device 104 to calculate the position within a predefined time period. At step 504, a best position is computed within the specified time period, and a corresponding indicia of accuracy is derived. For example, the process 301 of FIG. 3 or the process 401 of FIG. 4 may be performed to compute the best position within the specified time period along with a corresponding indicia of accuracy.

At step 506, a determination is made as to whether the best position produced at step 504 is sufficiently accurate. For example, the indicia of accuracy corresponding to the best position produced at step 504 may be compared to a threshold. If the best position is sufficiently accurate, the process 500 proceeds to step 508. At step 508, the best position and the corresponding indicia of accuracy are retained in the position cache 234. At step 510, the best position and corresponding indicia of accuracy are sent to the position server 102. The method 500 may then be repeated by returning to step 502.

If, at step 506, the best position produced at step 504 is not sufficiently accurate, the method 500 proceeds instead to step 512. At step 512, a determination is made as to whether there are any positions retained in the position cache 234. For a given iteration of the method 500 (i.e., a given position request), a position may be retained in the position cache 234 at step 508 if such position is deemed sufficiently accurate at step 506. If there are no retained positions in the position cache, the method 500 proceeds to step 514. At step 514, the mobile device 104 sends an indication to the position server 102 that no accurate position has been obtained. The method 500 may then be repeated by returning to step 502.

If, at step 512, at least one position has been retained in the position cache 234, the method 500 proceeds to step 516. At step 516, the position cache 234 is searched for a position having the "best" indicia of accuracy (i.e., the most accurate retained position is identified). At step 518, the position identified at step 516 and its corresponding indicia of accuracy are sent to the position server 102. Alternatively, only the position may be sent to the position server 102. For example, the mobile device 104 may be located in an environment with the signal levels of the satellite signals are very low (e.g., indoors). The position error resulting from improper position computation of signals having low signal strength is generally for greater than the distance traveled indoors. As such, the use of the previously retained position provides a better location than using the presently computed position (i.e., the position computed at step 504). The method 500 may then be repeated by returning to step 502.

At optional step 517, a determination is made as to whether the most accurate retained position identified at step 516 is still accurate. For example, the position with the best accuracy may be deemed "old" with respect to a time threshold. Alternatively, the mobile device 104 may have some knowledge of current approximate position that may be used to determine that the position with the best accuracy is now inaccurate (e.g., a large difference between current position and the previous position may indicate an inaccuracy). The mobile device 104 may obtain an approximate position using various position estimation techniques known in the art, including use of transitions between base stations of the wireless communication network 106, use of a last known location of the mobile device 104, use of a location of a base station in communication with the mobile device 104, use of a location of the wireless communication network 106 as identified by a network ID, or use of a location of a cell site of the wireless communication network 106 in which the mobile device 104 is operating as identified by a cell ID. If the most accurate retained position is no longer accurate, the method 500 proceeds to step 519, where the most accurate retained position is removed from the position cache 234. From step 519, the method 500 returns to step 512. If, at step 517, the most accurate retained position is still accurate, the method 500 proceeds to step 518.

Although various embodiments, which incorporate the teachings of the present invention have been shown and described in detail herein, those skilled in the art can readily devise many other varied embodiments that still incorporate these teachings.

What is claimed is:

1. A method of processing position information in a mobile device, comprising:
   receiving a request for a position to be computed within a predefined period of time;
   calculating a plurality of positions within said predefined period of time;
   caching at least one of said plurality of positions in a position cache;
   deriving accuracy data with respect to at least one of said plurality of positions;
   identifying a best position calculated during said predefined period of time; and
   in response to said best position failing to meet an accuracy threshold, sending an indication that no accurate position was obtained.

2. The method of claim 1, wherein said best position is identified before expiration of said predefined period of time.

3. The method of claim 1, wherein said best position is a last calculated position of said plurality of positions with respect to expiration of said predefined period of time.

4. The method of claim 1, further comprising:
   storing at least a portion of said accuracy data in said position cache.

5. The method of claim 1, wherein said deriving step comprises:
   computing an indicia of accuracy for each position stored in said position cache; and
   storing each said computed indicia of accuracy in said position cache.

6. The method of claim 5, wherein each said indicia of accuracy is derived from at least one of a covariance matrix of a Kalman filter, pseudorange residual data, or dilution of precision data.

7. The method of claim 5, further comprising:
   sending said best position and a stored indicia of accuracy associated with said best position to a server in communication with said mobile device.

8. The method of claim 5, further comprising:
   comparing a stored indicia of accuracy associated with said best position to said accuracy threshold; and
   sending said best position to a server in communication with said mobile device in response to said stored indicia of accuracy associated with said best position satisfying said accuracy threshold;
   wherein said indication of no accurate position is sent to said server.

9. The method of claim 1, further comprising:
   sending said best position to a server in communication with said mobile device.

10. The method of claim 1, wherein said request is received from a server in communication with said mobile device.

11. The method of claim 1, wherein said request is generated by said mobile device.

12. The method of claim 1, further comprising deleting any position that does not satisfy said accuracy threshold.

13. A method of processing position information in a mobile device, comprising:
   receiving a request for a position to be computed within a predefined period of time;
   computing a best position and a corresponding indicia of accuracy within said predefined period of time;
   comparing said indicia of accuracy to a threshold;
   retaining said best position in a cache in response to said indicia of accuracy satisfying said threshold;

in response to said indicia of accuracy failing said threshold searching said cache for a previously retained position having a best accuracy; and in response to no accurate previously retained position being stored in said cache, sending an indication of no accurate position to a server.

14. The method of claim 13, further comprising:
sending said best position to a server in communication with said mobile device.

15. The method of claim 13, further comprising:
identifying said previously retained position in said cache having a best accuracy; and
sending said previously retained position to a server in communication with said mobile device.

16. The method of claim 13, further comprising:
identifying a previously retained position in said cache having a best accuracy in response to said indicia of accuracy failing said threshold;
comparing said best accuracy of said previously retained position to a second threshold; and
sending said previously retained position to a server in communication with said mobile device in response to said best accuracy satisfying said second threshold.

17. The method of claim 16, further comprising:
searching said cache for another previously retained position having a second best accuracy in response to said best accuracy failing said threshold.

18. The method of claim 13, wherein said computing step comprises:
calculating a plurality of positions within said predefined period of time;
caching at least one of said plurality of positions;
deriving an indicia of accuracy with respect to at least one of said plurality of positions;
and identifying said best position and said corresponding indicia of accuracy.

19. The method of claim 18, wherein said best position is identified before expiration of said predefined period of time.

20. The method of claim 18, wherein said best position is a last calculated position of said plurality of positions with respect to expiration of said predefined period of time.

21. The method of claim 13, wherein said request is received from a server in communication with said mobile device.

22. The method of claim 13, wherein said request is generated by said mobile device.

23. The method of claim 13, further comprising deleting any position that does not satisfy said accuracy threshold.

24. The method of claim 13, wherein said best position is computed from a plurality of position calculations and wherein said computing is stopped before the predefined period expires.

25. A mobile device, comprising:
an A-GPS receiver for processing satellite signals;
a processor for calculating, from the processed satellite signals, a plurality of positions within a predetermined time, and for calculating accuracy data associated with said plurality of positions; and
a position cache, coupled to the processor, that stores at least one of said plurality of positions;
wherein the processor is configured to compare said accuracy data associated with said plurality of positions to an accuracy threshold; and
wherein the processor is configured to send an indication of no accurate position if none of the said positions meet said accuracy threshold.

26. The mobile device of claim 25, wherein the position cache is configured to store said accuracy data.

27. The mobile device of claim 25, wherein the processor derives said accuracy data from at least one of a Kalman filter, dilution of precision data or pseudorange residual data.

28. The mobile device of claim 25, further comprising:
a transceiver for receiving a request for a position to be computed within said predetermined time from a server.

* * * * *

UNITED STATES PATENT AND TRADEMARK OFFICE
CERTIFICATE OF CORRECTION

| | | |
|---|---|---|
| PATENT NO. | : 9,037,154 B2 | Page 1 of 1 |
| APPLICATION NO. | : 11/773062 | |
| DATED | : May 19, 2015 | |
| INVENTOR(S) | : Van Diggelen et al. | |

It is certified that error appears in the above-identified patent and that said Letters Patent is hereby corrected as shown below:

In the Claims

Column 9, lines 1-2, please replace "said threshold searching" with --said threshold, searching--.

Signed and Sealed this
Fifteenth Day of December, 2015

Michelle K. Lee
*Director of the United States Patent and Trademark Office*